Nov. 28, 1967    J. J. GATELY ETAL    3,355,593
CONTACTLESS SWITCHING DEVICE
Filed Dec. 2, 1964    2 Sheets-Sheet 1
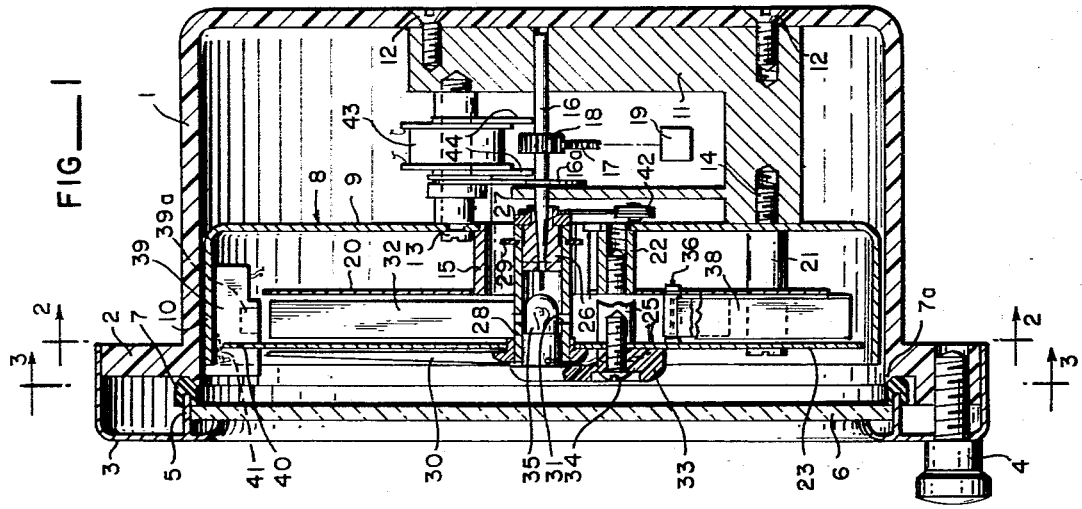
FIG—1
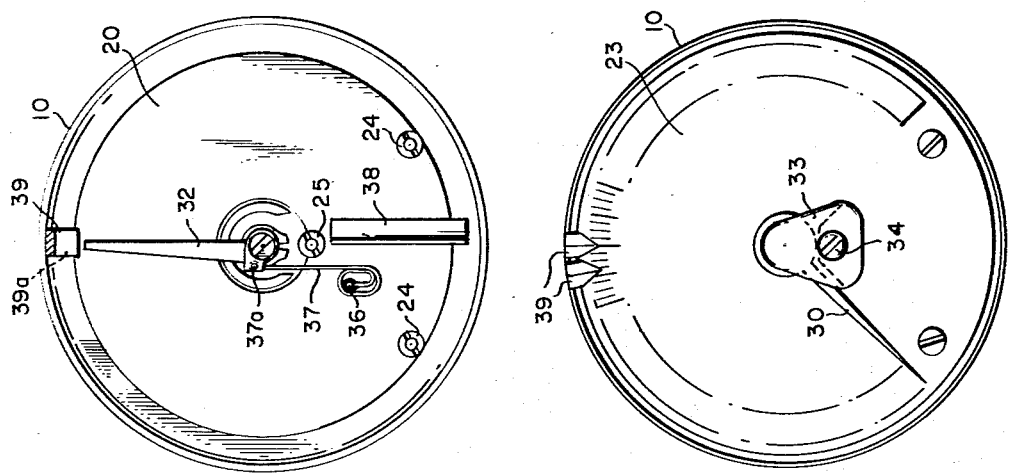
FIG—2
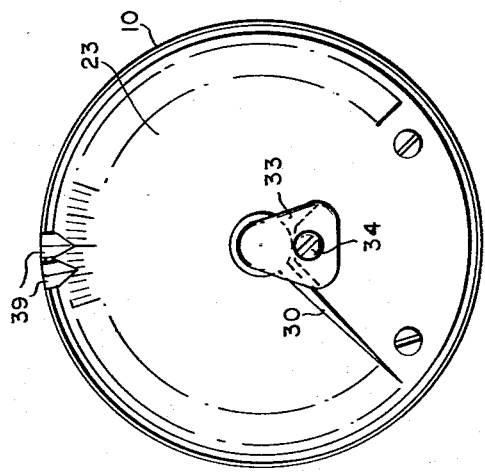
FIG—3
JAMES J. GATELY
HELMUTH SIEMER, JR.
INVENTORS
BY *Seed & Berry*
ATTORNEYS

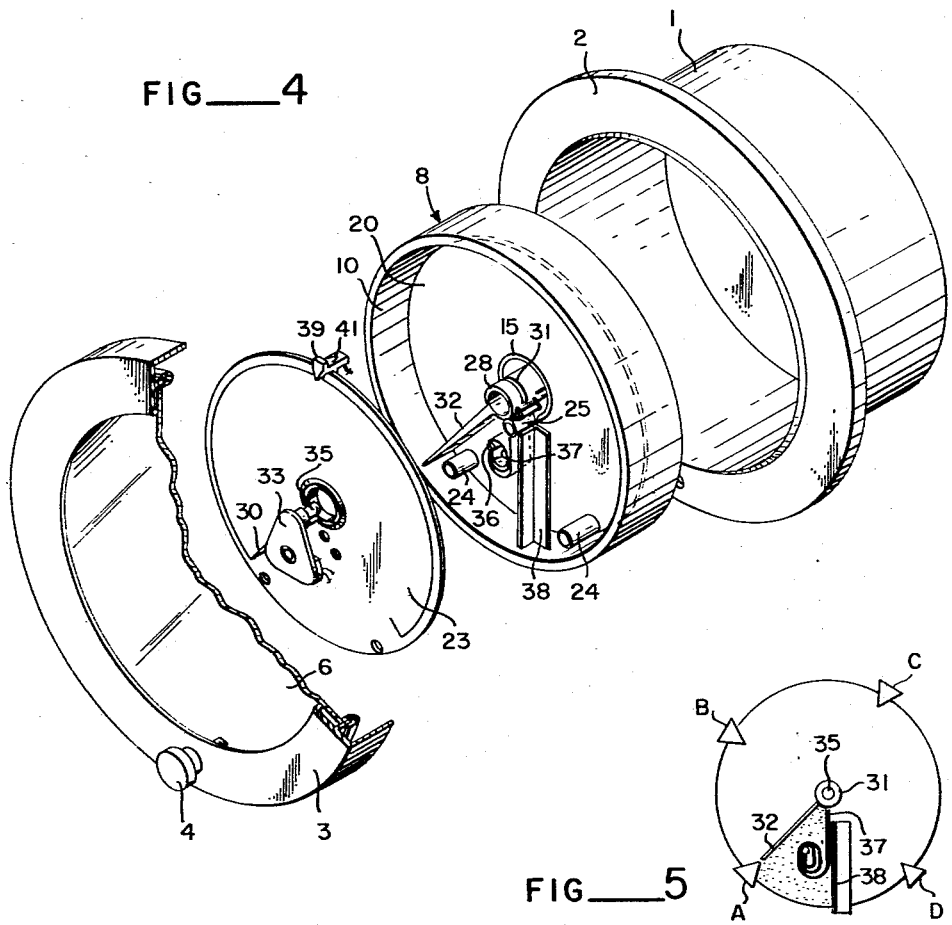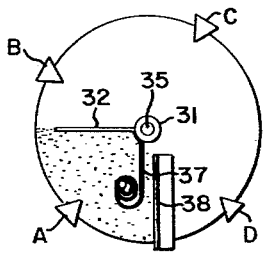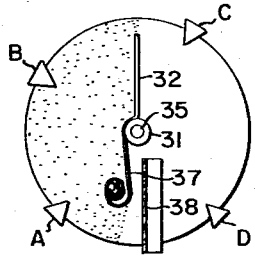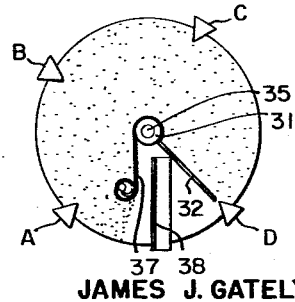

United States Patent Office 3,355,593
Patented Nov. 28, 1967

3,355,593
CONTACTLESS SWITCHING DEVICE
James J. Gately, Edmonds, and Helmuth Siemer, Jr., Bothel, Wash., assignors to The Instrument Laboratory Inc., Seattle, Wash., a corporation of Washington
Filed Dec. 2, 1964, Ser. No. 415,295
9 Claims. (Cl. 250—231)

ABSTRACT OF THE DISCLOSURE

A contactless switching arrangement for detecting the position of a rotatable indicator such as a dial pointer of a meter, gauge or the like. Adjustably positioned light-activated switching units or photo cells are used to signal the movement of the dial pointer to one or a plurality of set points to produce an alarm signal or for controlling equipment as a function of the movement of the dial indicator. A novel structural arrangement and concept is provided wherein the application of a light source is controlled by a flexible tape for increasing the effective range through which the switching device can be used. In addition, a novel vibrating means is provided to increase the accuracy of the meter or gauge by offsetting the effect of the load placed on the movable elements of the meter or gauge.

Background of the invention

In the past, the most commonly used switching systems for signalling the positions of a dial indicator have been of the type utilizing miniature electrical contacts with one of the contacts being fitted on the movable pointer and the other contact being located at an adjustable set point on the dial. In this arrangement, a signal is produced when the dial coincides with the set point contact which completes an electrical circuit. The utility of such systems is limited in many cases by the fact that the indicator or pointer cannot pass through or beyond the set point due to the physical contact needed to produce a signal. The indicator can be fitted with only two sets of contacts with the indicator pointer having to stay between the set points. If this scheme is provided with means for allowing the indicator to pass the set point, either the contact returns to its original condition after it had been passed or must be reset manually. The use of dry contacts also renders the switching system undependable due to low holding pressures. Most of these prior art devices are also limited to a 180° range of travel of the indicator pointer and thus are not only limited in their capabilities but are also unsuited for use with electrical meters or the like which have indicator pointers that travel over a range of approximately 270°.

Although some recent switching systems have utilized light sensitive switching units, such systems have been limited to a range of 180° of pointer travel because of the inability to control the light source over a greater degree of arc. Such devices are therefor unacceptable for use with meters and gauges having pointers with a greater range of movement.

The primary object of the present invention is, therefore, to provide a contactless switching device for detecting indicator pointer travel over a wider range of movement than heretofore possible.

Another object of the present invention is to provide a contactless switching device of the character described for activating switching units at a plurality of adjustable set points positioned throughout the range of rotational movement of the indicator pointer.

Another object of the present invention is to provide a contactless switching device of the character described which eliminates the need for physical contact between an indicator pointer and a switching unit so as to avoid undue detrimental effect on the accuracy of the indicator pointer.

Another object of the present invention is to provide a switching device of the character described which utilizes a light source and light activated switching units with means to control the light source as a function of indicator pointer travel.

A further object of the present invention is to provide a switching device of the character described wherein light activated switching units are conditioned by the passage of an indicator pointer and which hold the set condition until the pointer returns.

A still further object of the present invention is to provide a switching device of the character described with means to eliminate the inaccuracy of the meter or gauge caused by the load of the switching arrangement on the dial pointer.

Other more particular objects and advantages of the invention will, with the foregoing, appear and be understood from the following description and claims, the invention consisting of the novel construction and adaptation and combination of parts hereinafter described and claimed.

Reference is made now to the accompanying drawings in which:

FIG. 1 is a cross sectional view of the indicator portion of a gauge or a meter incorporating the present invention;

FIG. 2 is a front elevational view taken along lines 2—2 of FIG. 1;

FIG. 3 is a front elevational view taken along lines 3—3 of FIG. 1;

FIG. 4 is an exploded view showing the relationship of the various components of the device; and FIGS. 5 through 8 illustrate the sequence of operation of the switching device at various positions of the dial pointer.

Referring now to the drawings, wherein like reference numerals indicate identical parts in the various views, the device includes a cylindrical casing 1 which may be conventional in form and includes an annular flange 2. A sealed face for the casing 1 is provided by means of the annular ring 3 which engages the flange 2 and is secured thereto by means of the clamping bolt 4. An annular rib 5 extends about the inner periphery of the ring as illustrated in FIG. 1 for receiving the crystal or viewing glass 6. The crystal 6 may be held in place by the rubber grommet or gasket 7 in a conventional manner with the gasket 7 contacting a rib or the like 7a on the front of the casing 1. Thus, when the clamping bolt 4 is tightened, the crystal 6 is sealed against the face of the casing to provide an air tight cover for the casing as is conventional in meters and gauges of the type under consideration.

Mounted within the casing 1 is a shell or can indicated generally at 8 and having a circular back portion 9 and cylindrical wall portion 10. The can 8 may be mounted within the casing 1 by any desired framing or support structure such as the support member 11 secured to the back wall of the casing 1 by means of screws 12. The framing 11 will differ depending on the type of meter or gauge involved and is shown by way of example only. The can 8 may then be rigidly fixed to the support member 11 by a plurality of attaching bolts such as the bolt 13 and the lower bolts 14. A centrally located opening is provided in the rearwall 9 of the can 8 and is fitted with a cylindrical member 15 which extends forwardly from the back wall 9 toward the front of the instrument.

A freely rotatable shaft 16 is journaled for rotation in the frame member 11 and constitutes the drive shaft for the pointer indicator mechanism presently to be described. Although the shaft 16 is shown with a simple mounting in FIG. 1, it will be apparent to those skilled in the art that any desirable type of bearing mounts or the like may be provided for the shaft 16 in order to support the shaft for free rotation. Since the novel switching mechanism presently to be described, is suitable for use with any type of meter or gauge, the condition responsive mechanism for rotating the shaft 16 is shown only schematically in FIG. 1 and will include a sector gear or the like 17 in mesh with a suitable pinion 18 fixed to the rotatable shaft 16. The movement of the sector gear 17 will be controlled by any desirable linkage responsive to a sensing unit 19 indicated schematically in FIG. 1. It will be understood that the sensing mechanism 19 represents any known type of conventional sensing means, for instance, responsive to fluid pressure, temperature, or an electrical circuit for which an indication is desired. The details of such structures have been eliminated from the drawings for ease of illustration of the essential structure for implementing the present invention. The sensing device 19 will usually be mounted within the casing 1 to the rear of the can 8 and may take any form, depending upon the particular type of meter being utilized. Thus it will be understood that the shaft 16 is caused to rotate in response to some condition, as above explained, as sensed by the mechanism 19 which drives the sector gear 17.

Spaced forwardly from the back wall 9 of the can 8 is a first circular plate 20 which has a central opening to accommodate the outer end of the cylindrical member 15 and which is held in place by a plurality of spacers 21 surrounding the bolts 14 and a centrally located spacer 22 which engages the front face of the back wall 9. Spaced forwardly from the plate 20 is a circular dial plate 23 which is held in spaced relation by means of the spacers 24 and a second centrally located spacer 25 as indicated most clearly in FIG. 4. As shown in FIG. 3, the dial face 23 is provided with quantitative indicia for directly reading numerical values which correspond to the rotation of the shaft 16, as will presently be described. The dial face 23 also includes a central circular opening in axial alignment with the opening in the plate 20 and the cylindrical member 15.

Fixed to the front end of the rotatable shaft 16 is an adapter member 26 which includes an adjustably positioned ring 27 screw threadedly engaged on the adapter 26. A cylindrical hub member 28 is fitted on the forward end of the adapter 26 and may include longitudinal slots near its inner end so as to be clamped to the adapter 26 by means of a snap ring or the like 29. The hub 28 is positioned in abutment with the ring 27 as shown in FIG. 1. Thus the hollow cylindrical hub 28 is caused to rotate with the rotatable shaft 16 and is provided with a press fitted dial pointer 30 keyed to the hub at its outer end for reading values directly from the indicia on the dial face 23 as shown in FIG. 3.

As shown most clearly in FIGS. 1, 2 and 4, the hollow cylindrical hub 28 is provided with an approximately 270° slot 31 extending through the body of the hub with a rectangular flag 32 integral with the body of the hub at its base as shown most clearly in FIG. 2. The base of the flag 32 bridges the slot 31 and is integral with the body of the hub 28. As illustrated in FIG. 1, the flag 32 operates between the plate 20 and the dial face 23 as the hub 28 rotates.

A light source is provided by means of the lamp holder 33 which is received in the outer end of the hollow cylindrical hub 28 and secured to the spacer 25 by means of the bolt 34. The holder 33 serves to mount a small lamp 35 located within the hub 28. As will be obvious, the lamp 35 provides a light source, the rays of which pass through the slot 31 for illuminating portions of the area between the plate 20 and the dial face 23 as will presently be described. It will also be understood that the lamp holder 33 remains stationary, with clearance being provided for the rotation of the hub 28 about the base of the lamp. As shown most clearly in FIGS. 2 and 4, a pin 36 is fixed to the face of the plate 20 and serves to anchor one end of a flexible tape 37 with the tape being looped loosely several times about the pin and then extending upwardly to be anchored on a second pin 37 carried at the base of the flag 32. Also mounted on the front face of the plate 20 is a vertically disposed stationary blind member 38. In assembling the parts so far described, the dial pointer 30 will be fitted on the end of the hub 28 so as to correspond in position with the flag member 32. As the hub 28 is caused to rotate, the dial pointer follows the position of the flag member 32 in its arc about the axis of the shaft 16 as its center.

With the structure thus far described, provision is made for the lighting of the area between the plate 20 and the dial face 23 ahead of the movable flag 32 and the pointer 30 with the blacking out of the area behind the flag 32 as it moves through its arc of travel. In its zero or unactuated position, the shaft 16 is held returned by a suitably calibrated coil spring 16a attached to the shaft 16 and anchored at any stationary point such as the bolt 13 as shown in FIG. 1. In the unactuated position, the flag 32 and the dial pointer 30 will be arranged to be at rest in the position shown in FIG. 3 with the flag 32 being limited in its counter-clockwise travel by the pin 36 and the spacer 24. In this position, the light source 35 lights the entire space between the plate 20 and the dial face 23 except for that area between the blind member 38 and the flag 32. Upon rotation of the shaft 16, responsive to the sensing unit 19, the flag 32 and dial pointer 30 move clockwise about the dial face with the tape 37 being wrapped around the hub 28 to cover the slot 31 so as to block the light source from illuminating the area between the plate 20 and the space 23 behind the flag 32 and between the flag and the blind member 38. The arc through which the flag 32 may travel may be limited by the second spacer 24 or any other stop means with the extreme limit of travel being dictated by the position of the blind 38. Thus, although an approximate 270° is possible in the particular device illustrated, theoretically, the area to be blacked out may approach 360° and is limited only by the physical placement of the blind 38 and the tape 37.

In order to obtain a signal from the movement of the dial pointer 30 and the flag 32 at any given point along the arc of travel, a plurality of light responsive switching units 39 are provided and include photo cells 39a. It will, of course, be possible to provide any number of such switching devices and the number shown in the drawings is by way of illustration only. The photo cell portions of the switching units 39 are conventional photo cell units, the function of which is well understood by those skilled in the art and their details form no part of the present invention. Each of the switching units 39 includes a solid body portion with a slot 40, whereby the unit may be engaged over the outer peripheral edge of the dial face 23 as indicated in FIGS. 1 and 4. Yieldable pressure may be provided between the units 39 and the inside surface of the can 8 by means of spring biasing members 41 which press against the inside surface of the cylindrical portion 10 of the can. Since the dial face 23 and the can 8 are stationary, the switching units 39 may be moved about the periphery of the dial face and located at any given spot or set point on the dial. It may also be desirable to shape the front end of the switching units 39 in the form of an arrow to accurately position the switching unit on the dial face. As will be understood by those skilled in the art, the conventional function of a photo cell is to give an electrical response when exposed to a light source. Thus, with a plurality of switching units 39 located about the dial face as indicated in the drawings, and with the photo cells being located between the plate 20 and the dial plate 23 as indicated in FIG. 1, the application of the light source 35 to the photo cells is determined by the position of the flag 32 as it moves through its arc of travel. The sequence of operation of a typical meter embodying the present invention will be explained fully in connection with FIGS. 5 to 8 of the drawings.

In addition to the structure described, the adapter 26 may also be fitted with a counter weight 42 located diametrically opposite the position of the flag 32 and dial pointer 30 in order to balance, as nearly as possible, the loading on the shaft 16. As will be appreciated, the loading of a condition responsive shaft, such as the shaft 16, of a sensitive precision meter or the like ofttimes results in what is termed as "sticking" of the indicator pointer so as to give an untrue reading from the sensing unit. This condition may also be caused by imperfection in the bearings for the rotatable shaft or imperfections in other moving parts. In order to overcome this difficulty, the meter or gauge must ofttimes be tapped or jarred in order to get a true reading from the dial pointer. According to the present invention, a novel means for providing a constant vibration of the rotatable shaft 16 in order to maintain it centered in its bearings is provided by way of an electrical coil 43 mounted stationary on the bolt 13. The coil 43 is wound about a core having pole members 44 which extend downwardly to a position closely adjacent the surface of the shaft 16 with very slight clearance being provided to allow free rotation of the shaft. The coil 43 acts as a field coil to set up a magnetic flux path or circuit from one pole member 44 through the shaft 16 and into the other pole in a conventional manner. The coil 43 may either be supplied from an alternating current source or from a direct current source and a suitable DC pulsater. With this arrangement, the flux path between the poles 44 is constantly reversed in direction, setting up rapid vibrations in the shaft 16 which maintain the shaft centered in its bearings regardless of any unbalanced load placed on it by the switching device described. Thus the observer is assured of a true and accurate reading from the dial pointer 30.

Referring now to FIGS. 5 through 8, the sequence of operation of the switching device of the present invention will be described in detail. FIGS. 5 through 8 show a four step sequence of operation in which four set points A, B, C and D have been arranged at random around the dial. The position of the flag 32, of course, coincides with that of the indicator pointer 30 on the dial face 23. The flag 32 casts a continually widening shadow on the set points as it proceeds up the scale.

As shown in the first position indicated in FIG. 5, with the flag 32 at the zero point, the lamp 35 lights most of the internal area between the plate 20 and the dial plate 23 and all set points A, B, C and D are exposed and are thus actuated to energize conventional relays or the like, not shown. The light radiates from the lamp 35 in the center of the dial and covers, in the present embodiment, approximately 270° of arc as it radiates from the lamp 35 in the center of the dial and covers, in the present embodiment, approximately 270° of arc as it radiates through the slot 31 in the periphery of the hub 28. As the flag 32 proceeds up scale in a clockwise direction past set point A to the position shown in FIG 6, set point A is darkened so as to deactivate the photo cell and to deenergize a corresponding relay or the like. Likewise, as the flag proceeds further up scale past set point B to the position shown in FIG. 7, the photo cell in set point B is also deactivated with a like result. At this point, if it were not for the tape 37, winding up on the hub 28, set point A would then be re-exposed to the light, since the light shielding of the hub covers only approximately 90° of arc. The tape 37 comes into play and keeps the light from reaching set point A. The function of the tape becomes more apparent as the flag 32 moves further up scale as shown in FIG. 8. Thus the photo cells of the various set points, after being deactivated, remain in that condition until the pointer and flag 32 return down scale.

It will be readily apparent to those skilled in the art that the present invention provides novel and useful improvements in switching devices of the character described. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. A switching device for signaling the position of a rotatable dial pointer comprising: a hollow rotatable hub for mounting said pointer, a dial plate surrounding said hub adjacent said pointer, a second plate spaced from said dial plate on the side thereof remote from said pointer, a light source located in said hub, said hub being provided with an extensive arcuate slot for directing light rays from said light source between said plates, a flag carried by said hub coinciding in position with said pointer and located between said plates, a flexible tape fixed to said hub and to a point on one of said plates with slack being provided to allow said tape to wrap about said hub when it rotates, and light sensitive signal devices adjustably positioned about the periphery of said dial plate and located between said dial plate and said circular plate, whereby the application of light rays from said source to said signal devices may be controlled by the rotation of said hub.

2. The device according to claim 1 wherein said signal devices constitute a plurality of photo cell units slidably mounted on the periphery of said dial plate, and a stationary blind means carried by said circular plate and extending radially from said hub closely adjacent said tape.

3. The device according to claim 1 wherein said slot extends about said hub over an arc of aproximately 270°.

4. A light actuated switching device comprising: spaced parallel plates, a rotatable hub extending through said plates, said hub including an arcuate slot therein and a light source located within the hub, a flag fixed to said hub and rotatable therewith between said plates, a flexible tape having one end fixed to one of said plates and the other end fixed to said hub at the base of said flag, whereby said tape will wrap about said hub to cover said slot as the hub rotates, and a plurality of light sensitive signal means located about the arc of travel of said flag to be activated by said light source and deactivated when said flag passes such that said light source is blanked by said flag and said tape.

5. The device according to claim 4 wherein said slot extends about said hub over an arc of approximately 270°, and said light sensitive signal means constitutes a plurality of photo cell units slidably mounted on the periphery of one of said plates.

6. A light actuated switching device comprising in combination: a rotatable hub having a light source therein with arcuate slot means to allow passage of light rays, a flag member carried by said hub and extending radially therefrom, flexible tape means attached to said hub and adapted to wrap about said hub as it rotates so as to progressively cover said slot behind said flag, and light sensitive signal means located about the arc of travel of said flag being responsive to the light rays from said source and the darkened condition caused by the covering of said slot for producing a signal.

7. The device according to claim 6 wherein said slot extends about said hub over an arc of approximately 270°, and said light sensitive signal means constitute a plurality of photo cell units slidably mounted on the periphery of one of said plates.

8. A light actuated switching device comprising: a rotatable hub, a flag extending radially from said hub, a light source mounted within said hub, arcuate slot means in said hub extending substantially the circumference thereof for emitting light rays from said source, flexible tape means anchored at a point spaced from said hub and attached to said hub adjacent the base of said flag, said tape being adapted to wrap about said hub as it rotates to progressively cover said slot behind said flag, and a plurality of light sensitive signal means located about the arc of travel of said flag to be controlled by light rays from said source.

9. A switch device for signaling selected positions of a rotatable member as it moves in a given direction comprising: a hub, a radially extending arm fixed to said hub, a light source, means for mounting said source in said hub for illuminating the area on both sides of said arm, light sensitive signal means located about the arc of travel of said arm, and flexible tape means adapted to wrap about said hub to progressively blank out said light source on one side only of said arm as it is rotated in said given direction.

References Cited
UNITED STATES PATENTS

| | | | |
|---|---|---|---|
| 654,103 | 7/1900 | Schrottke | 324—155 |
| 2,199,071 | 4/1940 | Gale | 250—219 |
| 3,054,928 | 9/1962 | Schrenk et al. | 250—231 |

RALPH G. NILSON, *Primary Examiner.*

D. J. WALL, *Assistant Examiner.*